United States Patent [19]
Gregg

[11] Patent Number: 5,254,049
[45] Date of Patent: Oct. 19, 1993

[54] SYNCHRONOUS DRIVE BELT

[75] Inventor: Michael J. W. Gregg, Lincoln, Nebr.

[73] Assignee: The Goodyear Tire & Rubber Company, Akron, Ohio

[21] Appl. No.: 876,992

[22] Filed: May 1, 1992

[51] Int. Cl.$^5$ .......................... F16G 1/28; F16G 5/20
[52] U.S. Cl. .................................................. 474/205
[58] Field of Search ............... 474/148, 153, 164, 202, 474/204, 205; 198/832, 834

[56] References Cited

U.S. PATENT DOCUMENTS

| | | | |
|---|---|---|---|
| 4,037,485 | 7/1977 | Hoback | 474/153 X |
| 4,099,737 | 7/1978 | Waugh | 474/159 X |
| 4,915,674 | 4/1990 | Tanaka et al. | 474/153 |

FOREIGN PATENT DOCUMENTS

| | | | |
|---|---|---|---|
| 49962 | 4/1982 | European Pat. Off. | 474/153 |
| 2660039 | 9/1991 | France | 474/205 |

*Primary Examiner*—Ramon S. Britts
*Assistant Examiner*—Roger J. Schoeppel
*Attorney, Agent, or Firm*—Marc R. Dion, Sr.

[57] ABSTRACT

A synchronous drive belt for use in low speed and high torque applications has a zero pressure angle over a relatively greater portion of the fore and aft flank surfaces of the belt teeth when used in a belt-pulley combination. A pulley is also described which is particularly suitable for use in combination with the belt.

3 Claims, 1 Drawing Sheet

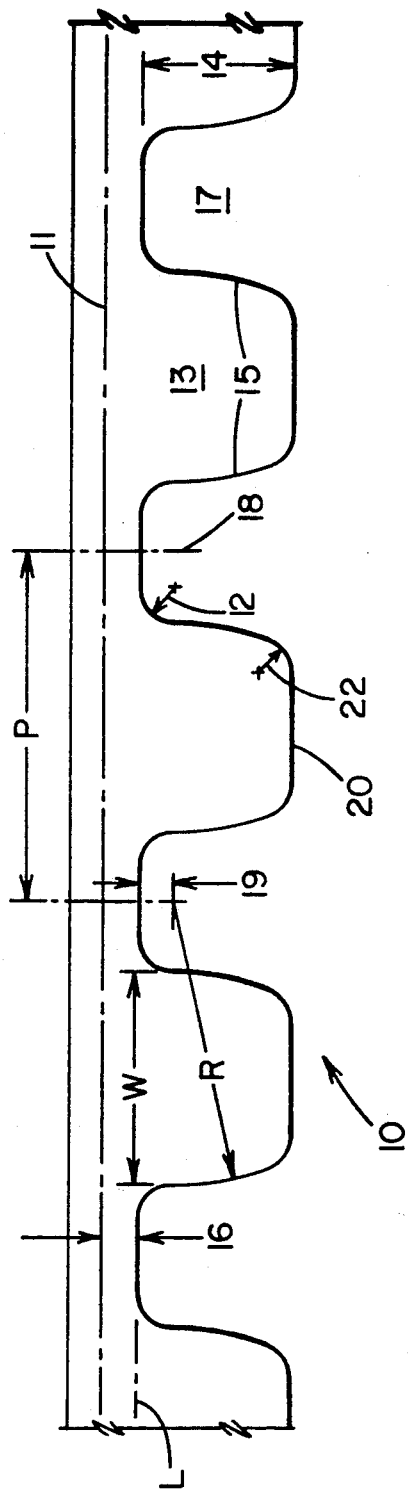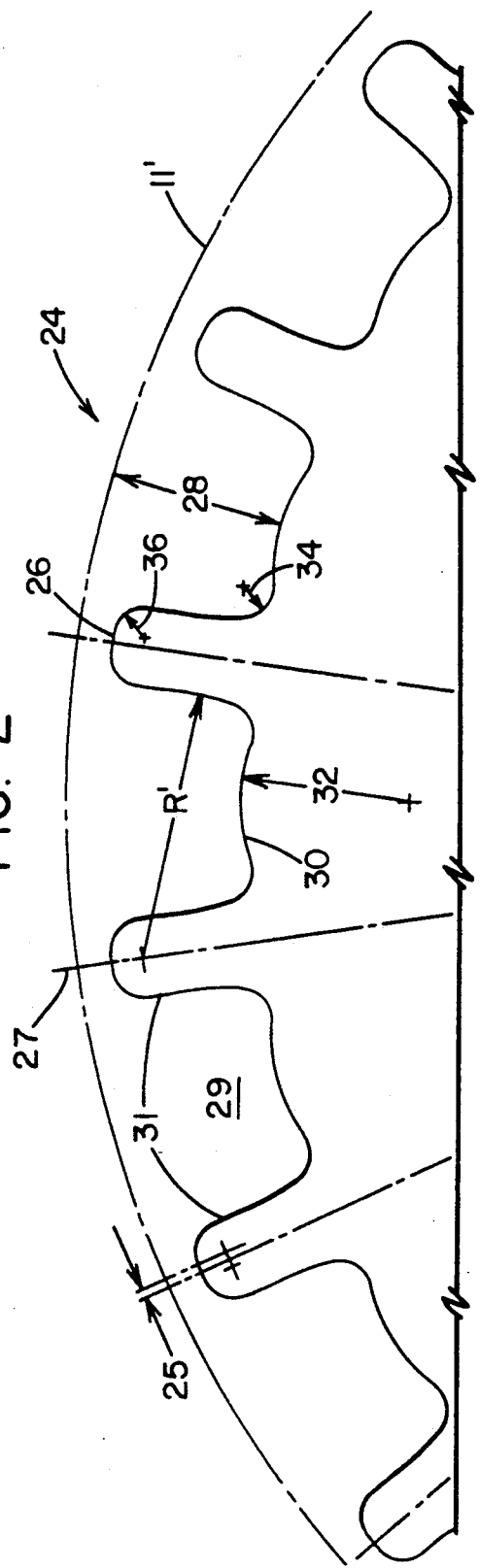

SYNCHRONOUS DRIVE BELT

FIELD OF THE INVENTION

This invention relates to synchronous drive belts. More particularly, it relates to a synchronous drive which is suitable for uses under conditions of low speed and high torque.

BACKGROUND OF THE INVENTION

Applications for drive mechanisms requiring low speed and high torque such as in bicycles and other exercise equipment have generally used roller chains. Roller chains have their pitch line fixed by a line going through the center of their rollers which lies below the tips of the sprocket teeth. The surface of the sprocket tooth engages the roller at a point when it is perpendicular to the pitch line, thus, yielding a zero pressure angle. Therefore, when a torque is applied to the sprocket, the chain does not tend to ride off the sprocket even when the slack side of the chain has zero tension. In many instances, the chain will break before it climbs out of the sprocket teeth and ratchets.

In synchronous drive belt and pulley systems, such as illustrated in my prior U.S. Pat. Nos. 3,924,481; 3,969,946 and 4,108,011, the tensile load bearing component on which the pitch line is centered lies outside the pulley teeth. Those belts, generally for use in high speed, low torque applications, have their fore and aft tooth flanks designed to have a pressure angle between 10° and 20° to allow for smooth engagement and disengagement. The pressure angle is that angle at which the belt tooth and the pulley tooth flanks contact each other when compared to a line drawn radially from the pulley center. To minimize ratcheting, or the tendency for the belt to ride off the pulley sprockets, it is desirable to have a pressure angle of zero.

Another factor influencing ratcheting is the distortion of the tooth under load. Synchronous belt teeth are made from elastomeric materials and as such will deform under load. They are cantilevered on the belt tensile member, thus, as the belt tooth distorts over the pulley tooth, the pressure angle increases resulting in an outward or radial force tending to lift the belt out of the pulley. U.S. Pat. No. 3,756,091 illustrates a belt having a zero pressure angle. It can be appreciated, however, that the contact surface on the belt tooth flank at zero pressure angle is very short and the pressure angle increases rapidly along the flank away from the tooth root.

In accordance with the practice of the present invention, there is provided a synchronous drive belt wherein the belt teeth have a zero pressure angle over a relatively greater length along the tooth flank and wherein other design criteria as set forth herein have been specified to reduce tooth distortion. There is also disclosed a pulley whose design criteria are complimentary to those of the belt to provide a unique combination.

BRIEF DESCRIPTION OF THE DRAWINGS

FIG. 1 is a side elevational view of a portion of a belt according to the invention.

FIG. 2 is a side elevational view of a portion of a for use with the belt of FIG. 1.

DETAILED DESCRIPTION OF THE DRAWINGS

FIG. 1 illustrates a portion of an endless synchronous drive belt shown generally at 10. The belt 10 is made of a resilient elastomer reinforced by a longitudinal tensile member which lies along the pitch line 11 and is made up usually of a plurality of cords of a high elastic modulus. These cords may be made from glass fiber, carbon fiber, steel, polyester, high tenacity rayon or preferably, polyaramid. The tooth tip 20 may, if required, be reinforced with an abrasion resistant fabric, an example of which is nylon. The elastomers may be any of those known to be suitable for use in such belts, e.g. polychloroprene, polyurethane, NBR, IIR, IR, SBR, CSM, EPDM, other thermosets, thermoplastic elastomers and other polymer alloys.

The belt 10 has a succession of identical teeth 13, each having a tooth depth 14, which are uniformly spaced apart by their pitch P and have fore and aft flank surfaces 15, the space between adjacent teeth defining a land area 17 having a centerline 18 and lying below a land line L, wherein each said flank surface 15 is shaped, in cross-section, as an arc of a circle with a radius R having its center no further than said centerline away from its opposed flank and in said land area 17 below said land line L up to a distance 19 equal to one half said tooth depth 14. The tooth depth 14 is generally between 30% and 60% of the tooth pitch P. The tooth width W, being the widest distance between opposed fore and aft flank surfaces 15 is generally between 50% and 80% of the tooth pitch P in order to provide a tooth 13 which is resistance to distortion when under load. It is desired that the belt tooth flank radius R be between 60% and 90% of the tooth pitch P.

The transition from land line L to a tangent of the belt tooth flanks 15 which is perpendicular to said land line L is a tooth root radius 12 which inscribes an arc of 90° and has its center in the land area 17. The transition from the belt tooth flanks 15 to the belt tooth tip 20 is a belt tip blend radius 22 similarly defined as the tooth root radius 12. Tooth root radius 12 and tip blend radius 22 are preferably between 5% and 25% of the tooth pitch P.

It is also preferred that the center of radius R be located at a distance 19 from land line L equal to the tooth root radius 12. The pitch line differential 16 is defined as the distance between the land line L and the pitch line 11.

Belt 10 is best used in combination with a pulley 24 as illustrated in FIG. 2. Pulley 24 has a plurality of identical peripheral belt engaging teeth 26 defining between themselves pulley cavities 29. Each pulley cavity 29 has a fore and an aft flank surface 31 which is shaped in cross-section as the arc of a circle whose radius R' has its center located within the pulley tooth 26 no further away than the pulley tooth radial centerline 27 from the opposed cavity flank surface 31 and radially inward from the pulley tooth 26 tip, a distance equal to or greater than the belt tooth root radius 12. The pulley cavity flank radius R' is equal to or greater than the belt tooth flank radius R.

The pulley cavity 29 has a cavity depth 28 measured from the cavity base 30 to a pitch circle 11' which is a line circumscribed around the outer periphery of the pulley 24 by a distance equal to the pitch line differential 16. The cavity depth 28 is preferably between 85% and 95% of the belt tooth depth 14 plus the pitch line differential 16. The cavity base 30 can be flat but is preferably convex having an arc whose radius 32 is between 40% and 60% of pitch P. The cavity flank to base blend radius 34 is preferably less than or equal to tooth tip blend radius 22. The pulley tooth tip blend radius 36 is preferably equal to or greater than the belt tooth root radius 12.

While the center of cavity flank radius R' can be spaced a distance 25 from centerline 27, it is preferred that the center be at centerline 27.

While certain representative embodiments and details have been shown for the purpose of illustrating the invention, it will be apparent to those skilled in this art that various changes and modifications may be made therein without departing from the spirit or scope of the invention.

What is claimed is:

1. An endless synchronous drive belt comprised of a resilient elastomer, reinforced with one or more reinforcing members extending along and thereby defining a pitch line, with a succession of identical teeth, each having a tooth depth, uniformly spaced apart by their pitch P, having fore and aft flank surfaces, the space between adjacent teeth defining a land line and a tooth root radius which inscribes a 90° arc which forms the transition between the land line and a tangent to the flank surface perpendicular to the land line and has its center in said land area wherein each said flank surface is shaped in cross-section as an arc of a circle with a radius R having its center located in said land area no further than said centerline away from its opposed flank and below said land line from a distance equal to said tooth root radius up to one half said tooth depth.

2. The belt according to claim 1 wherein the tooth depth is between 30% and 60% of tooth pitch P.

3. The belt according to claim 1 wherein the tooth width W, being the widest distance between the fore and aft flank surfaces, is between 50% and 80% of tooth pitch P.

* * * * *